June 9, 1953 W. F. BANKAUF ET AL 2,641,515
IDLER BEARING SEAL
Filed Sept. 20, 1950
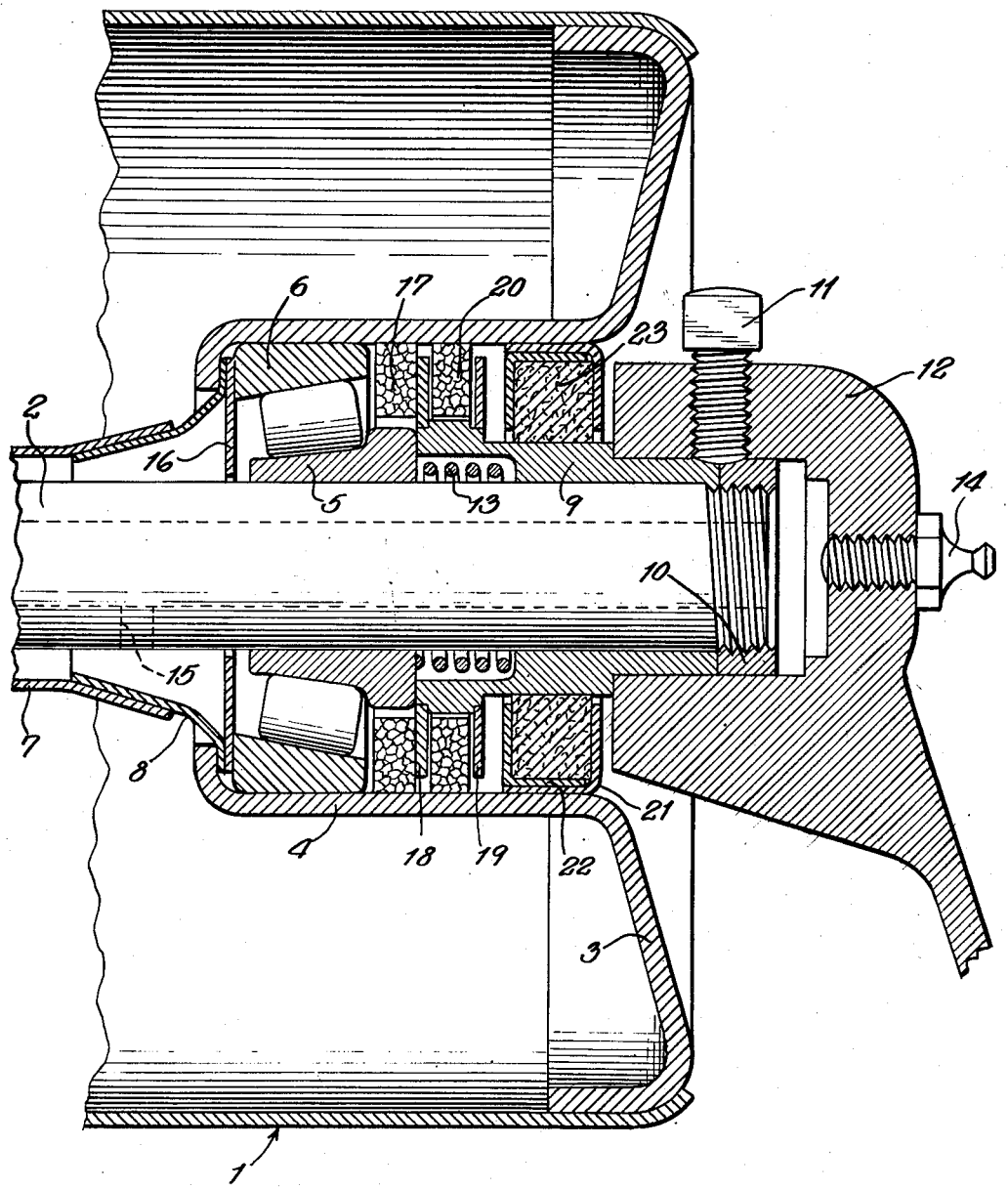
INVENTORS
WILLIAM F. BANKAUF
WILLIAM E. HERRMANN
HAMILTON M. ROSS
BY Burgess Ryan & Hicks
ATTORNEYS Patented June 9, 1953

2,641,515

UNITED STATES PATENT OFFICE 2,641,515

IDLER BEARING SEAL

William F. Bankauf, East Paterson, William E. Herrmann, Maywood, and Hamilton M. Ross, Wortendyke, N. J., assignors to Hewett-Robins Incorporated, Buffalo, N. Y., a corporation of New York Application September 20, 1950, Serial No. 185,814

3 Claims. (Cl. 308—20)

This invention relates generally to idler pulleys of the kind used to support conveyor belts and is in the nature of an improvement on the subject matter of Patent No. 2,207,790, dated July 16, 1940.

The primary object of this invention is to make better provision for sealing the idler bearings against the escape of lubricant and the entry of dust or the like.

The invention will be readily understood from the following description of the accompanying drawing, which is a vertical section through the bearing end portion of an idler pulley and its associated parts having the preferred form of the invention applied to it.

As is common in such constructions, the idler pulley, generally designated 1, is mounted for rotation on a stationary hollow shaft 2. The pulley flange member 3 incorporates a cylindrical hub casing 4 within which are an anti-friction bearing and the components of the grease and dust seal. As shown, a roller bearing having an inner race 5 and an outer race 6 is located at the inner end of the hub casing. Surrounding the shaft is a tubular casing 7 supported by a funnel-shaped duct 8 which is clamped between the inner end of the hub casing and the outer bearing race 6. Mounted on the shaft within the hub casing and shown as abutting the inner bearing race 5 is a collar 9 which is locked against movement relatively to the shaft by a lock nut 10 and a set screw 11 carried by the upper end of the shaft post 12 in which the collar is seated. The spring 13 serves to take up wear in the bearing and grease is supplied to the bearing by way of fitting 14, the hollow interior of shaft 2 and shaft hole 15. All of these numbered components are or may be of the same construction as those described in the said prior Patent No. 2,207,790.

At the inner or left-hand end of the bearing and clamped at its outer margin between race 6 and the hub casing is a gasket washer 16, there being clearance between the washer and the shaft to provide for the passage of grease to the bearing. At the outer or right-hand end of the bearing, the inner race 5 is encircled by an annular grease seal element 17. This element, which may be of cork composition or the like, has an outer diameter such that the periphery of the element closely engages the hub casing for rotation therewith. It will be noted that there is clearance between the inner race and the grease seal element affording free rotation of the grease seal element about the inner race.

On the inner end of collar 9, two spaced washer members 18, 19 are mounted. These members are press-fitted on the collar or otherwise secured to it, so as to become to all intents and purposes a part of the collar. These washer members, however, are spaced from the hub casing. Washer member 18 forms an abutment for engagement by grease seal element 17; and between the washer members there is located a second and similar grease seal element 20, which, like element 17, engages the hub casing for rotation with it but is clear of the collar.

When grease is forced through the fitting 14, it finds its way to the bearing through the hollow interior of shaft 2 and hole 15, as above mentioned, and then through the clearance space between gasket washer 16 and the shaft; and, as the grease passes through the bearings and builds up pressure in the limited space between the bearing and element 17, it tends to force that element into sealing engagement with washer member 18. Similarly, any grease getting past this seal under the pressure incident to filling the bearing tends to force element 20 into sealing engagement with washer member 19, with the result that the possibility of grease escaping during pressure filling is remote.

On the outer or right-hand side of the described grease seals, a further seal is provided. This is primarily a dust seal and in this preferred form consists of a unit made up of annular angle shaped members 21, 22 press-fitted together and clamping between them a dust seal element 23 of felt or the like. The inwardly opening U-sectioned shell made up of the elements 21, 22 is press-fitted into the hub casing or otherwise secured for rotation with it, with the dust seal element 23 in rubbing engagement with collar 9.

It will be understood that the described bearing and seal arrangement is duplicated at the other end of the pulley; also that after the illustrated bearing has been filled in the manner described, the introduction of more grease through fitting 14 fills up the interior of shaft 2 and also the space between the shaft and casing 7, by which paths the grease is then supplied to the similar bearing at the other end of the pulley.

The described arrangement is highly effective to prevent the escape of grease while it is under pressure during filling and minimize the escape of grease after such pressure has been relieved and the pulley is running on the shaft. Several features of the construction contribute to this latter aspect of the invention.

While the pulley is rotating, the funnel-shape of duct 8 tends to give rise to an outward flow of grease due to centrifugal action; that is to say, both radially and axially outward of the shaft. However, since the gasket washer is in sealing engagement with the hub casing, it restrains any such flow and prevents the building up of undue grease pressure tending to force additional grease into the bearing and through the seal, particularly at the zone of maximum diameter of duct 8, where the centrifugal action is greatest.

It has also been found that the amount of grease escaping from the seal is dependent to some extent upon the amount of grease permitted to accumulate on the outer side of the anti-friction bearing. In this connection, it will be noted that by virtue of the described construction the amount of this surplus grease on the outer side of the bearing is held to a minimum, due to the fact that the grease seal element 17 substantially fills the space within the hub casing bounded by washer 18 and the bearing itself.

In prior seal constructions, it has been found that escaping grease has a tendency, due to centrifugal action, to work radially outwardly over the surface of pulley flange 3 and, in some instances, even reach the conveyor belt riding on the pulley, which, of course, is highly objectionable. In this instance, any such tendency is reduced by holding to a minimum the radius at which any grease which does pass through the entire seal can emerge from it. As will be noted, the dust seal shell 21, 22 is closely fitted to and rotates with the hub casing and if any grease at all escapes, it can only emerge between the dust seal element 23 and the collar 9.

Where the terms "outer side" and "inner side" are used in the above description and in the claims to indicate the relative locations of the various components axially of the shaft, outer side is intended to mean on the side toward the adjacent shaft end or to the right as viewed in the drawing and inner side is intended to mean on the side remote from the adjacent shaft end or to the left as viewed in the drawing.

In the light of the foregoing, which will be understood to describe only the preferred form of the invention, the following is claimed:

1. A bearing seal for an idler of the kind including a pulley having a cylindrical hub casing, a hollow shaft extending therethrough, an anti-friction bearing between the casing and the shaft at the inner end of the casing and a collar secured to the shaft and extending from the bearing to the outer end of the shaft, comprising an annular grease seal element adjacent the outer end of the anti-friction bearing having its outer periphery engaged with the hub casing for rotation therewith; a pair of spaced washer members secured to the collar with clearance between their outer peripheries and the hub casing, the inner of said washer members lying adjacent the outer surface of the grease seal element; a second annular grease seal element located between the washer members with its outer periphery engaged with the hub casing for rotation therewith; an annular shell of inwardly opening U-section, on the outer side of said washer members, encircling but spaced from the collar and secured to the hub casing for rotation therewith; an annular dust seal element clamped in said shell with its inner periphery engaging the collar; and a gasket washer encircling but spaced from the shaft on the inner side of the bearing, the outer periphery of said gasket washer having sealing engagement with the hub casing.

2. In an idler of the kind including a pulley having a cylindrical hub casing, a hollow shaft extending therethrough, an anti-friction bearing between the casing and the shaft at the inner end of the casing and a collar secured to the shaft and extending from the bearing to the outer end of the shaft, the improvement which comprises: an annular grease seal element adjacent the outer end of the anti-friction bearing having its outer periphery engaged with the hub casing for rotation therewith; a pair of spaced washer members secured to the collar with clearance between their outer peripheries and the hub casing, the inner of said washer members lying adjacent the outer surface of the grease seal element; a second annular grease seal element located between the washer members with its outer periphery engaged with the hub casing for rotation therewith; and, on the outer side of said washer members, an annular shell of inwardly opening U-section encircling but spaced from the collar and secured to the hub casing for rotation therewith and an annular dust seal element clamped in said shell with its inner periphery engaging the collar.

3. In an idler of the kind including a pulley having a cylindrical hub casing, a hollow shaft extending therethrough, an anti-friction bearing between the casing and the shaft at the inner end of the casing and a collar secured to the shaft and extending from the bearing to the outer end of the shaft, the improvement which comprises: an annular grease seal element adjacent the outer end of the anti-friction bearing having its outer periphery engaged with the hub casing for rotation therewith; a pair of spaced washer members secured to the collar with clearance between their outer peripheries and the hub casing, the inner of said washer members lying adjacent the outer surface of the grease seal element; a second annular grease seal element located between the washer members with its outer periphery engaged with the hub casing for rotation therewith; and a gasket washer encircling but spaced from the shaft on the inner side of the bearing, the outer periphery of said gasket washer having sealing engagement with the hub casing.

WILLIAM F. BANKAUF.
WILLIAM E. HERRMANN.
HAMILTON M. ROSS.

References Cited in the file of this patent
UNITED STATES PATENTS

| Number | Name | Date |
|---|---|---|
| 1,639,684 | Bott | Aug. 23, 1927 |
| 1,991,077 | Brittain | Feb. 12, 1935 |
| 2,207,790 | Fairbairn | July 16, 1940 |